(12) United States Patent
Song et al.

(10) Patent No.: US 11,454,150 B2
(45) Date of Patent: Sep. 27, 2022

(54) THERMAL SHOCK RESISTANT AND ASYMMETRIC HONEYCOMB CERAMIC WALL-FLOW FILTER

(71) Applicant: SHANDONG SINOCERA FUNCTIONAL MATERIAL CO., LTD, Shandong (CN)

(72) Inventors: Xibin Song, Dongying (CN); Bing Zhang, Dongying (CN); Xi Zhang, Dongying (CN)

(73) Assignee: SHANDONG SINOCERA FUNCTIONAL MATERIAL CO., LTD, Shandong (CN)

( * ) Notice: Subject to any disclaimer, the term of this patent is extended or adjusted under 35 U.S.C. 154(b) by 80 days.

(21) Appl. No.: 16/767,738

(22) PCT Filed: Nov. 21, 2018

(86) PCT No.: PCT/CN2018/116702
§ 371 (c)(1),
(2) Date: May 28, 2020

(87) PCT Pub. No.: WO2019/128559
PCT Pub. Date: Jul. 4, 2019

(65) Prior Publication Data
US 2021/0003055 A1 Jan. 7, 2021

(30) Foreign Application Priority Data
Dec. 27, 2017 (CN) .......................... 201711444932.5

(51) Int. Cl.
*F01N 3/022* (2006.01)
*B01D 46/24* (2006.01)
*C04B 38/00* (2006.01)

(52) U.S. Cl.
CPC ....... *F01N 3/0222* (2013.01); *B01D 46/2429* (2013.01); *B01D 46/2466* (2013.01);
(Continued)

(58) Field of Classification Search
None
See application file for complete search history.

(56) References Cited

U.S. PATENT DOCUMENTS 4,335,023 A 6/1982 Dettling
6,159,431 A * 12/2000 Inoue ................. B01J 35/04
422/177

(Continued)

FOREIGN PATENT DOCUMENTS

CN 1549769 A 11/2004
CN 1750924 A 3/2006
(Continued)

OTHER PUBLICATIONS

Chinese Office Action and Search Report for Chinese Application No. 201811375365.7, dated Jul. 22, 2019.
(Continued)

*Primary Examiner* — Elizabeth Collister
(74) *Attorney, Agent, or Firm* — Birch, Stewart, Kolasch & Birch, LLP

(57) ABSTRACT

A thermal shock resistant and asymmetric honeycomb ceramic wall-flow filter includes an inlet honeycomb ceramic surface and an outlet honeycomb ceramic surface. Inlet channels and outlet channels are provided on both the inlet honeycomb ceramic surface and the outlet honeycomb ceramic surface. The inlet channels are in communication with the outlet channels. Outlet ends of the inlet channels and inlet ends of the outlet channels are sealed. An inner diameter of the inlet channel is greater than that of the outlet channel. A cross-section of the inlet channel is a square, or
(Continued)

two adjacent edges are connected by two connecting lines, or two adjacent edges are connected by two connecting lines or a circular arc located between the two connecting lines. The filter has good mechanical properties, low back pressure, and excellent thermal shock resistance.

5 Claims, 11 Drawing Sheets

(52) U.S. Cl.
    CPC ........ *C04B 38/0019* (2013.01); *B01D 46/249* (2021.08); *B01D 2258/012* (2013.01); *F01N 2330/06* (2013.01); *F01N 2330/30* (2013.01)

(56) References Cited

U.S. PATENT DOCUMENTS

| | | | | |
|---|---|---|---|---|
| 2005/0066639 A1* | 3/2005 | Frost | ................... | C04B 38/0009 55/523 |
| 2005/0166562 A1* | 8/2005 | Beall | ....................... | B29C 48/11 55/523 |
| 2005/0274097 A1* | 12/2005 | Beall | ....................... | B23H 9/00 55/523 |
| 2007/0128405 A1* | 6/2007 | Sakaguchi | ......... | B01D 46/2474 428/116 |
| 2007/0130897 A1* | 6/2007 | Sakaguchi | ............ | F01N 3/0222 55/523 |
| 2008/0271422 A1* | 11/2008 | Zawisza | ............. | B01D 46/2455 55/419 |
| 2011/0120089 A1 | 5/2011 | Koch et al. | | |
| 2014/0123611 A1* | 5/2014 | Toyoshima | ........... | C04B 35/573 55/523 |

FOREIGN PATENT DOCUMENTS

| | | |
|---|---|---|
| CN | 1856349 A | 11/2006 |
| CN | 1968732 A | 5/2007 |
| CN | 101687132 A | 3/2010 |
| CN | 103458991 A | 12/2013 |
| CN | 107489497 A | 12/2017 |
| CN | 108286465 A | 7/2018 |
| FR | 2969696 A1 | 6/2012 |
| JP | 2002-256842 A | 9/2002 |
| WO | WO 2011/038059 A1 | 3/2011 |
| WO | WO 2013/116869 A1 | 8/2013 |

OTHER PUBLICATIONS

Chinese Office Action for Chinese Application No. 201811375365.7, dated Feb. 3, 2020.
Chinese Office Action for Chinese Application No. 201811375365.7, dated Sep. 29, 2019.
International Search Report, issued in PCT/CN2018/116702, dated Feb. 22, 2019.

* cited by examiner

THERMAL SHOCK RESISTANT AND ASYMMETRIC HONEYCOMB CERAMIC WALL-FLOW FILTER

TECHNICAL FIELD

The present invention relates to the field of honeycomb ceramic filters, in particular to a thermal shock resistant and asymmetric honeycomb ceramic wall-flow filter.

BACKGROUND

A honeycomb ceramic wall-flow filter can remove carbon black in tail gas of gasoline engines and diesel engines. According to the current traditional filter design, a traditional filter is provided with an inlet honeycomb ceramic surface and an outlet honeycomb ceramic surface to serve as an inlet and an outlet and further provided with porous walls for separating the inlet from the outlet. The filter is divided into inlet channels (I for short) and outlet channels (O for short) by the mutually-connected walls. To catch carbon black and ash, the outlet ends of the inlet channels are sealed, and inlets of the outlet channels are sealed. The alternate sealing structure is like a checkerboard of chess. Through the design, the tail gas can be forced to pass through the porous walls, so that particles are deposited in the channels or on the walls. Usually, the inlet channels and the outlet channels have square sections with the same area. When the amount of the carbon black reaches a certain degree, the regeneration process happens, and the carbon black can be burnt away.

In application, it is similarly found that ash can be deposited in the inlet channels. Particles of the ash are composed of metal oxide, sulfate, phosphate and other substances, the particles cannot combust, and therefore the particles cannot be burnt away in the regeneration process. Thus, the ash will be deposited in the inlet channels all the time till the ash is mechanically cleaned out. Thus, before the ash is cleaned out, along with increasing of the running time of an engine, the amount of the ash in the inlet channels is larger and larger, and the back pressure of a whole tail gas treatment system is obviously increased.

At present, a method for reducing influences of ash on the back pressure is to increase the area of the inlet channels. For the same section area, it means that the area of the outlet channels needs to be reduced. By means of the method, more particles (carbon black and ash) can be contained in the enlarged inlet channels, in other words, the capacity of the filter for storing the particles is improved, and accordingly the back pressure is reduced. In the design for limited space, assistance of the structure for small filters is very important. Under the situation that the number of the filters is not changed, the distance between the angles of two adjacent inlet channels can be reduced due to enlarging of the inlet channels. When the distance becomes small, the mechanical strength of the filters can be weakened, and consequently a series of problems can be generated in production and application.

To increase the mechanical strength, some changes can be made on the angles of the inlet channels. In the prior art, chamfers are adopted as the angles of the inlet channels. Accordingly, the distance between adjacent angles is increased, and then strength is increased. Beveled angles are adopted as angles of inlet channels in some patents, compared with the chamfers, the distance between the adjacent angles is more increased through beveling, and accordingly the mechanical strength is better increased.

The mechanical strength can be increased in some inventions, but the back pressure and the thermal shock resistance need to be considered at the same time. For example, under the situation that the wall thickness is not changed, the area of the inlet channels can be excessively reduced in the above inventions, and consequently the back pressure is increased. Meanwhile, under the situation that the inlet channels are enlarged, filters can contain more particles. To sufficiently utilize this advantage, the regeneration time interval can be prolonged, and therefore better thermal shock resistance is required. The previous inventions do not well solve the problem about thermal shock, and consequently the potential of the design of large inlets and small outlets is limited.

SUMMARY

1. Technical Problems Needing to be Solved

The present invention aims at providing a thermal shock resistant and asymmetric honeycomb ceramic wall-flow filter, and the problems that in the prior art, the mechanical properties are poor, the back pressure is high, and the thermal shock resistance is poor are solved.

2. Technical Solution

To solve the above technical problems, the present invention provides a thermal shock resistant and asymmetric honeycomb ceramic wall-flow filter. The thermal shock resistant and asymmetric honeycomb ceramic wall-flow filter is characterized by comprising an inlet honeycomb ceramic surface and an outlet honeycomb ceramic surface, wherein inlet channels and outlet channels are provided on both the inlet honeycomb ceramic surface and the outlet honeycomb ceramic surface, the inlet channels are in communication with the outlet channels, outlet ends of the inlet channels and inlet ends of the outlet channels are sealed, and an inner diameter of each inlet channel is greater than that of each outlet channel; the cross-section of each inlet channel is a square and is provided with a fillet; or the cross-section of each inlet channel is a square, two adjacent edges of the square are connected by two connecting lines, and an obtuse angle is formed between the two connecting lines; or the cross-section of each inlet channel is a square, two adjacent edges of the square are connected by two connecting lines and a circular arc located between the two connecting lines, and an obtuse angle is formed between the two connecting lines.

Wherein, the range of the proportion of the inner diameter of each inlet channel to the inner diameter of each outlet channel is 1.1-1.5.

Wherein, the cross-section of each inlet channel is a square and is provided with a fillet, and the range of the proportion of a distance between the fillet of the adjacent inlet channels to a wall thickness is 0.8-1.4.

Wherein, the cross-section of each inlet channel is a square and is provided with a fillet, and the radius of the fillet is greater than 20% of the wall thickness and is smaller than 0.3 mm.

Wherein, the cross-section of each inlet channel is a square, two adjacent edges of the square are connected by two sequentially-connected connecting lines, an obtuse angle is formed between the two connecting lines, and the included angle between each connecting line and the edge, connected with the connecting lines, of the square is smaller than 30 degrees.

Wherein, the cross-section of each inlet channel is a square, two adjacent edges of the square are connected by a connecting part composed of two connecting lines and a circular arc located between the two connecting lines, an obtuse angle is formed between the two connecting lines, the length of the circular arc is smaller than 30% of the length of the connecting part.

Wherein, a cross-section of each outlet channel is a square.

Wherein, a cross-section of each outlet channel is a square and is provided with a fillet, the radius of the fillet is greater than 20% of a wall thickness and is smaller than 0.3 mm.

Wherein, a cross-section of each outlet channel is a square and is provided with a chamfer, and the length range of the bevel edge of the chamfer is 5-30% of a side length of the cross-section of the outlet channel.

3.3. Beneficial Effects

According to the thermal shock resistant and asymmetric honeycomb ceramic wall-flow filter provided by the present invention, improvements including fillet, double line or a combination of double line and circular arc are made on cross-sections of the inlet channels, so that the filter has good mechanical properties, low back pressure, and excellent thermal shock resistance.

Figure 1:
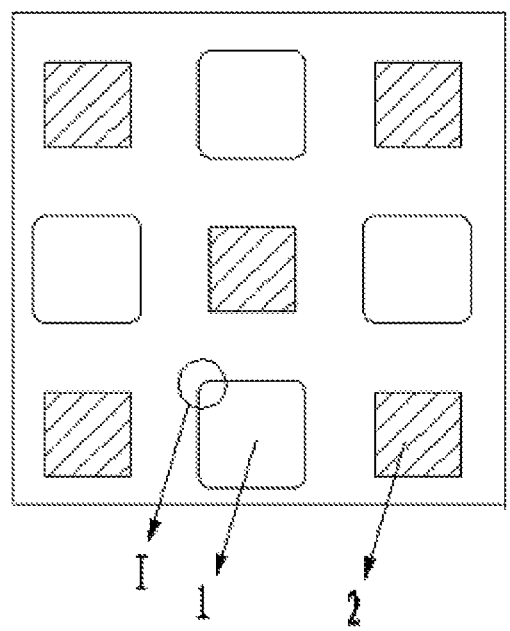
FIG. 1 is a local structure schematic diagram of an inlet honeycomb ceramic surface in Embodiment 1 of the present invention.

In the figures, 1 represents inlet channel; and 2 represents outlet channel.

DETAILED DESCRIPTION

The specific implementing manner of the present invention is further described in details in combination with figures and embodiments as follows. The following examples are used for explaining the present invention but not used for limiting the range of the present invention.

In the description of the present invention, it needs to be explained that unless additional specific regulation and limitation, the terms including installation, connecting and connection need to be understood widely, for example, connection can be fixed connection, detachable connection, or integrated connection; connection can also be mechanical connection or electric connection; connection can also be direct connection or indirect connection through intermediate media, and connection can also be interior communication of two elements. For those of ordinary skill in the art, the specific meaning of the above terms in the present invention can be understood according to the specific situation.

As shown in FIG. 1-FIG. 24, the present invention discloses a thermal shock resistant and asymmetric honeycomb ceramic wall-flow filter, characterized by comprising an inlet honeycomb ceramic surface and an outlet honeycomb ceramic surface, wherein inlet channels 1 and outlet channels 2 are provided on both the inlet honeycomb ceramic surface and the outlet honeycomb ceramic surface, the inlet channels 1 are in communication with the outlet channels 2, outlet ends of the inlet channels 1 and inlet ends of the outlet channels 2 are sealed, and an inner diameter of each inlet channel 1 is greater than that of each outlet channel 2; the cross-section of each inlet channel 1 is a square and is provided with a fillet; or the cross-section of each inlet channel 1 is a square, two adjacent edges of the square are connected by two connecting lines, and an obtuse angle is formed between the two connecting lines; or the cross-section of each inlet channel 1 is a square, two adjacent edges of the square are connected by two connecting lines and a circular arc located between the two connecting lines, and an obtuse angle is formed between the two connecting lines.

The honeycomb ceramic filter is provided with the inlet channels 1 for tail gas to enter and the outlet channels 2 for tail gas to exit. For the inlet channels 1, outlet ends of the inlet channels 1 are sealed while inlet ends are not sealed; and for the outlet channels 2, inlet ends of the outlet channels 2 are sealed while outlet ends are not sealed. The inlet channels 1 and the outlet channels 2 are separated by porous walls. Generally speaking, the wall porosity is 20%-70%. For gasoline engine and diesel engine tail gas filters, the average size of air holes is 5-50 microns and is preferably 10-30 microns. The honeycomb ceramic filter has 50-350 grids, preferably 100-300 grids, per square inch. The wall thickness can be from 0.05 mm to 0.5 mm and is preferably 0.1-0.4 mm.

Specifically, the filter of the present invention has skin, and the filter can be circular or oval or be in other shapes. The filter is composed of the inlet channels 1 and the outlet channels 2 formed by a series of mutually-connected porous walls. The inlet channels 1 and the outlet channels 2 constantly extend through the length of the whole filter. The filter is formed by means of the extrusion technology. Generally speaking, the material of the filter is ceramic materials such as cordierite, silicon carbide, aluminum titanate and mullite and can also be other extruded materials such as glass, glass ceramics, plastics and metal.

Wherein, the range of the proportion of the inner diameter of each inlet channel 1 to the inner diameter of each outlet channel 2 is 1.1-1.5. Preferably, the proportion range is 1.2-1.4.

According to the thermal shock resistant and asymmetric honeycomb ceramic wall-flow filter provided by the present invention, improvements such as fillet, double line or a combination of double line and circular arc are made on cross-sections of the inlet channels, so that the filter has good mechanical properties, low back pressure, and excellent thermal shock resistance.

The following embodiments are several situations of the present invention.

EMBODIMENT 1

Figure 2:
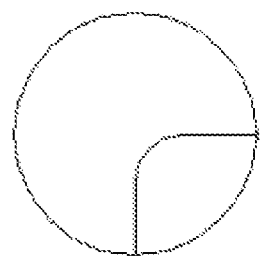
FIG. 2 is a local detailed drawing of I in FIG. 1.

As shown in FIG. 1-FIG. 2, the cross-section of each inlet channel 1 is a square and is provided with a fillet, and the range of the proportion of the distance between the fillet of the adjacent inlet channels 1 to the wall thickness is 0.8-1.4, and preferably, the proportion range is 0.9-1.3. Preferably, the radius of the fillet is greater than 20% of the wall thickness and is smaller than 0.3 mm. The cross-section of each outlet channel 2 is a square.

EMBODIMENT 2

Figure 3:
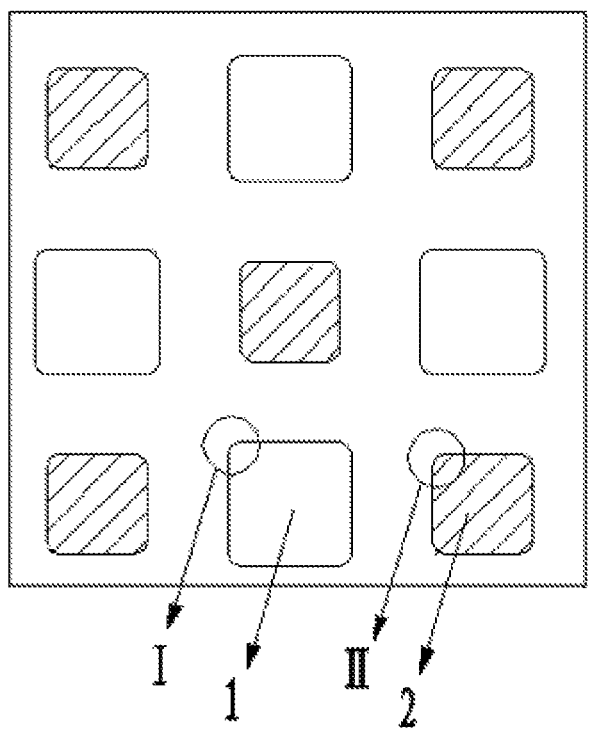
FIG. 3 is a local structure schematic diagram of an inlet honeycomb ceramic surface in Embodiment 2 of the present invention.
Figure 4:
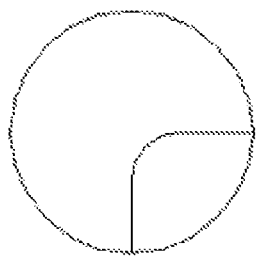
FIG. 4 is a local detailed drawing of I in FIG. 3.
Figure 5:
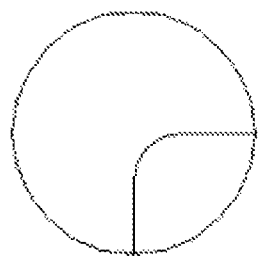
FIG. 5 is a local detailed drawing of II in FIG. 3.

As shown in FIG. 3-FIG. 5, the cross-section of each inlet channel 1 is a square and is provided with a fillet, and the range of the proportion of the distance between the fillet of the adjacent inlet channels 1 to the wall thickness is 0.8-1.4, and preferably, the proportion range is 0.9-1.3. Preferably, the radius of the fillet is greater than 20% of the wall thickness and is smaller than 0.3 mm. The cross-section of each outlet channel 2 is a square and is provided with a fillet, and the radius of the fillet is greater than 20% of the wall thickness and is smaller than 0.3 mm.

EMBODIMENT 3

Figure 6:
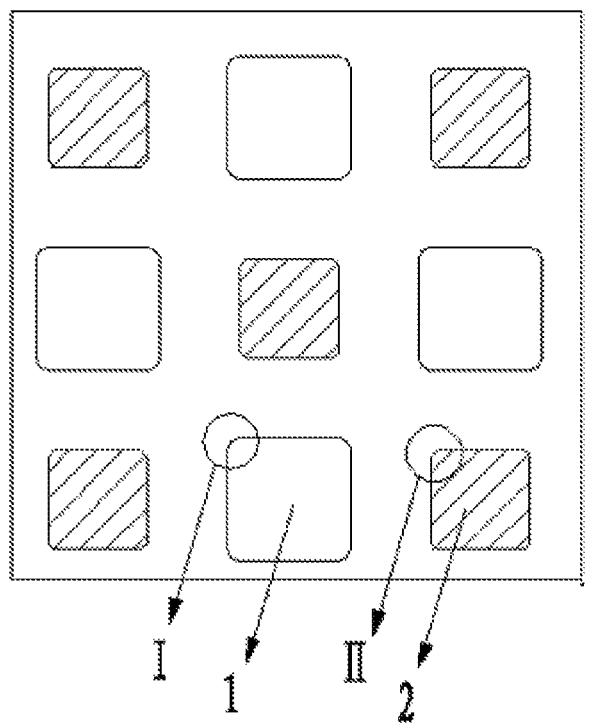
FIG. 6 is a local structure schematic diagram of an inlet honeycomb ceramic surface in Embodiment 3 of the present invention.
Figure 7:
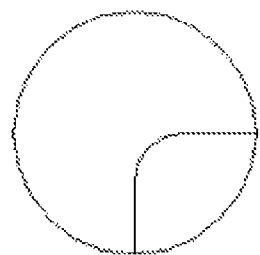
FIG. 7 is a local detailed drawing of I in FIG. 6.
Figure 8:
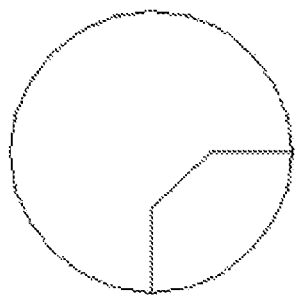
FIG. 8 is a local detailed drawing of II in FIG. 6.

As shown in FIG. 6-FIG. 8, the cross-section of each inlet channel 1 is a square and is provided with a fillet, and the range of the proportion of the distance between the fillet of the adjacent inlet channels 1 to the wall thickness is 0.8-1.4, and preferably, the proportion range is 0.9-1.3. Preferably, the radius of the fillet is greater than 20% of the wall thickness and is smaller than 0.3 mm. The cross-section of each outlet channel 2 is a square and is provided with a chamfer, the length range of the bevel edge of the chamfer is 5-30% of the side length of the cross-section of the outlet channel 2, and preferably, the chamfer can be a 45-degree angle and can also be a beveled angle and the like.

EMBODIMENT 4

Figure 9:
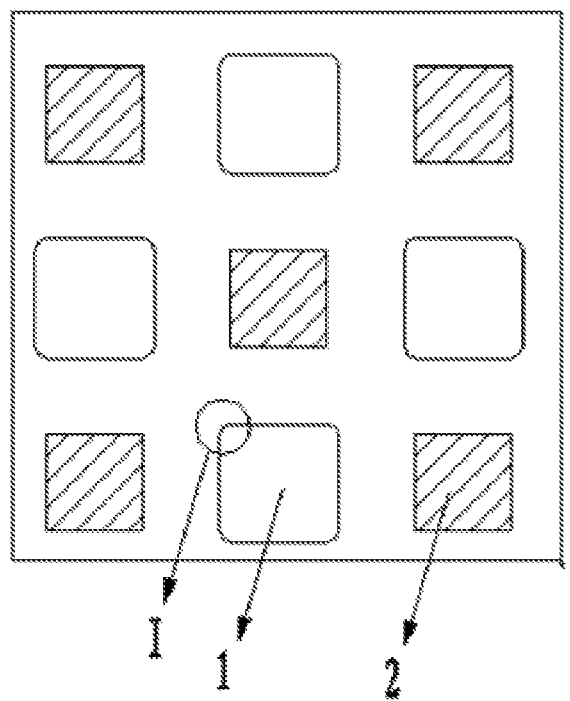
FIG. 9 is a local structure schematic diagram of an inlet honeycomb ceramic surface in Embodiment 4 of the present invention.
Figure 10:
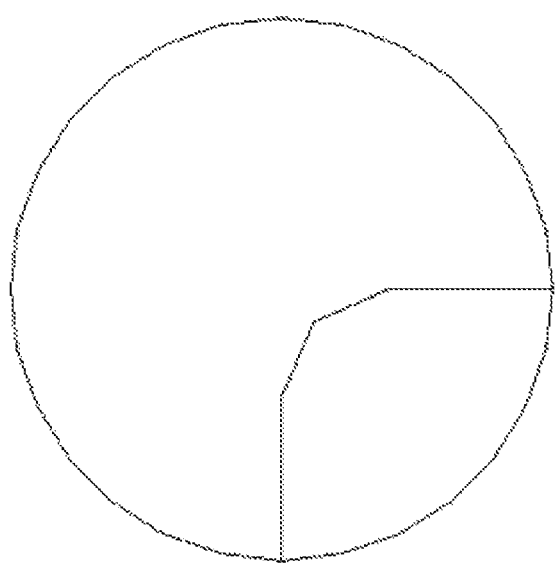
FIG. 10 is a local detailed drawing of I in FIG. 9.

As shown in FIG. 9-FIG. 10, the cross-section of each inlet channel 1 is a square, two adjacent edges of the square are connected by two connecting lines, an obtuse angle is formed between the two connecting lines, and the included angle between each connecting line and the edge, connected with the connecting line, of the square is smaller than 30 degrees, and preferably, the included angle is smaller than 15 degrees. According to the actual requirements, a smaller included angle can be selected. The cross-section of each outlet channel 2 is a square.

EMBODIMENT 5

Figure 11:
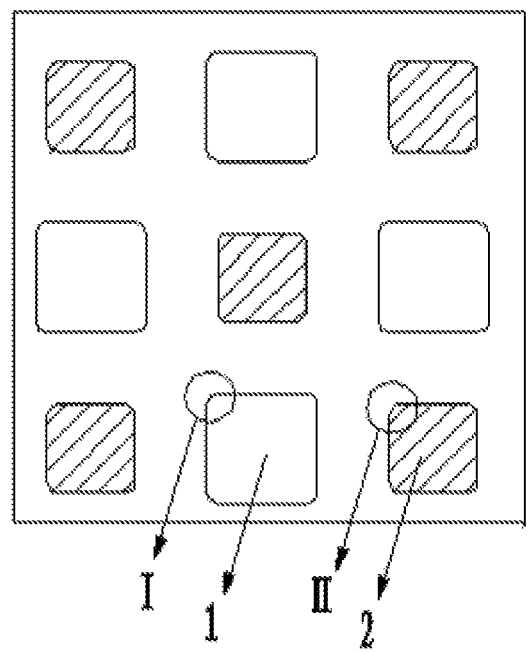
FIG. 11 is a local structure schematic diagram of an inlet honeycomb ceramic surface in Embodiment 5 of the present invention.
Figure 12:
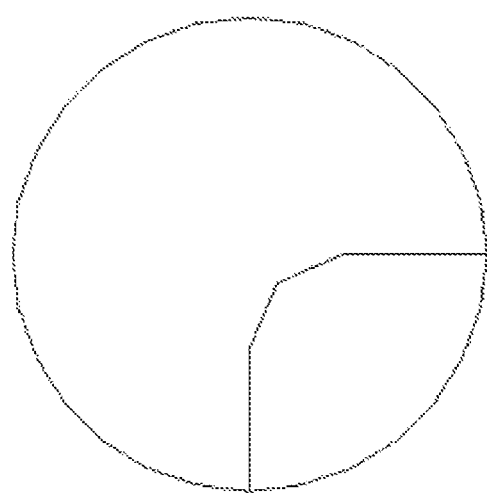
FIG. 12 is a local detailed drawing of I in FIG. 11.
Figure 13:
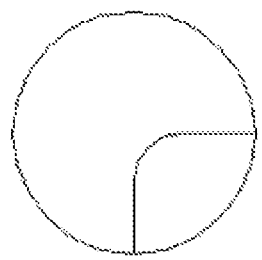
FIG. 13 is a local detailed drawing of II in FIG. 11.

As shown in FIG. 11-FIG. 13, the cross-section of each inlet channel 1 is a square, two adjacent edges are connected by two connecting lines, an obtuse angle is formed between the two connecting lines, and the included angle between each connecting line and the edge, connected with the connecting line, of the square is smaller than 30 degrees, and preferably, the included angle is smaller than 15 degrees. According to the actual requirements, a smaller included angle can be selected. The cross-section of each outlet channel 2 is a square and is provided with a fillet, and the radius of the fillet is greater than 20% of the wall thickness and is smaller than 0.3 mm.

EMBODIMENT 6

Figure 14:
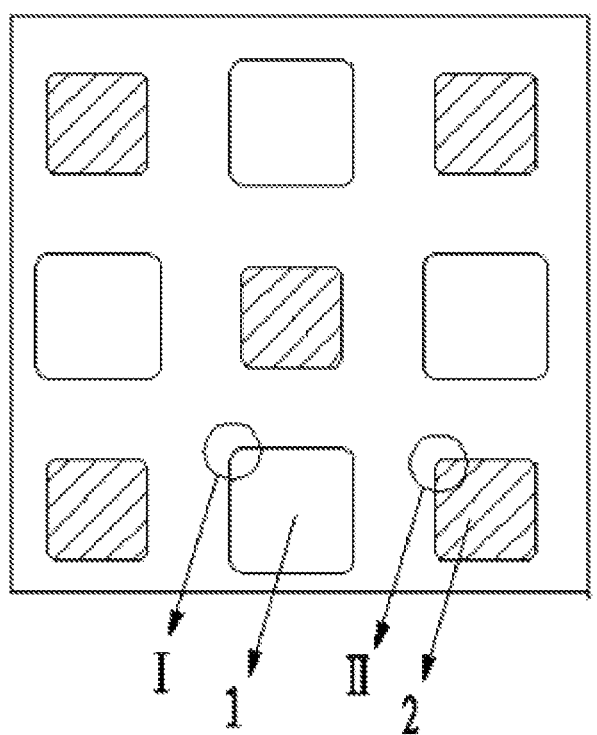
FIG. 14 is a local structure schematic diagram of an inlet honeycomb ceramic surface in Embodiment 6 of the present invention.
Figure 15:
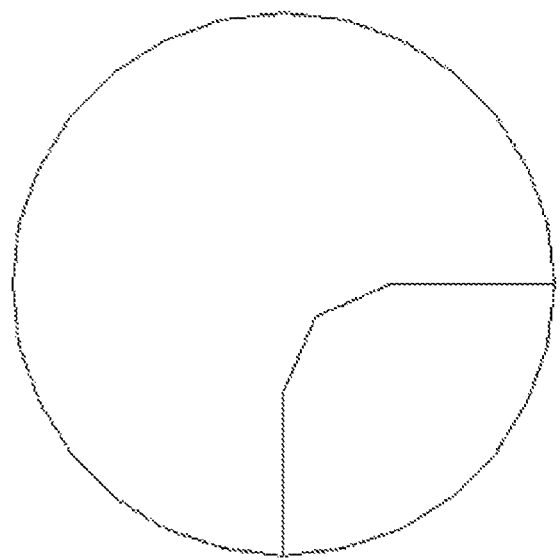
FIG. 15 is a local detailed drawing of I in FIG. 14.
Figure 16:
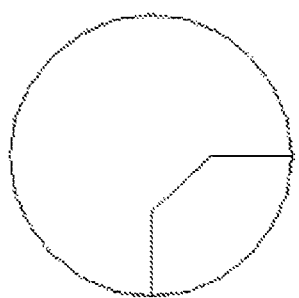
FIG. 16 is a local detailed drawing of II in FIG. 14.

As shown in FIG. 14-FIG. 16, the cross-section of each inlet channel 1 is a square, two adjacent edges of the square are connected by two connecting lines, an obtuse angle is formed between the two connecting lines, and the included angle between each connecting line and the edge, connected with the connecting line, of the square is smaller than 30 degrees, and preferably, the included angle is smaller than 15 degrees. According to the actual requirements, a smaller included angle can be selected. The cross-section of each outlet channel 2 is a square and is provided with a chamfer, the length range of the bevel edge of the chamfer is 5-30% of the side length of the cross-section of the outlet channel 2, and preferably, the chamfer can be a 45-degree angle and can also be a beveled angle and the like.

EMBODIMENT 7

Figure 17:
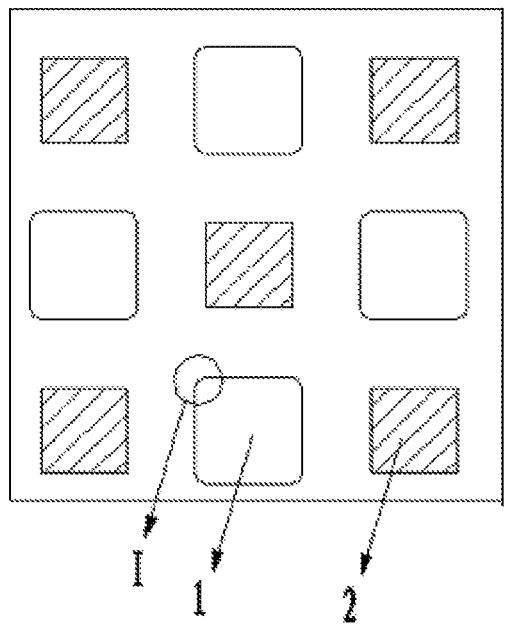
FIG. 17 is a local structure schematic diagram of an inlet honeycomb ceramic surface in Embodiment 7 of the present invention.
Figure 18:
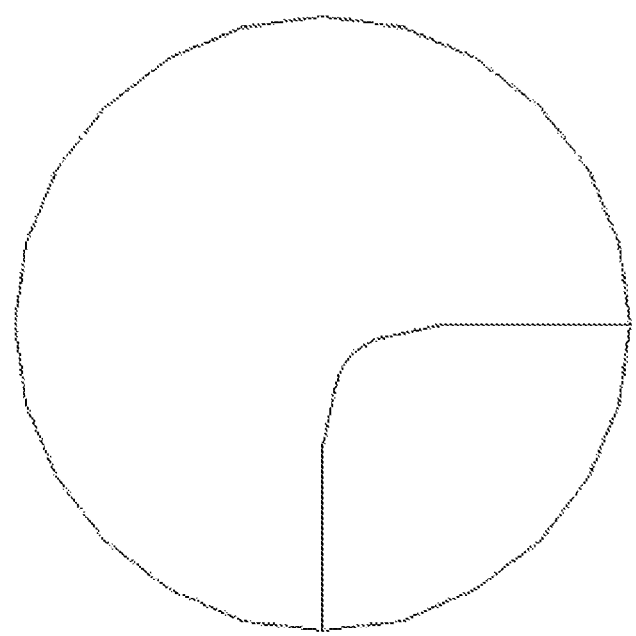
FIG. 18 is a local detailed drawing of I in FIG. 17.

As shown in FIG. 17-FIG. 18, the cross-section of each inlet channel 1 is a square, two adjacent edges of the square are connected by a connecting part composed of two connecting lines and a circular arc located between the two connecting lines, an obtuse angle is formed between the two connecting lines, the length of the circular arc is smaller than 30%, preferably 15%, of the length of the connecting part. The cross-section of each outlet channel 2 is a square.

EMBODIMENT 8

Figure 19:
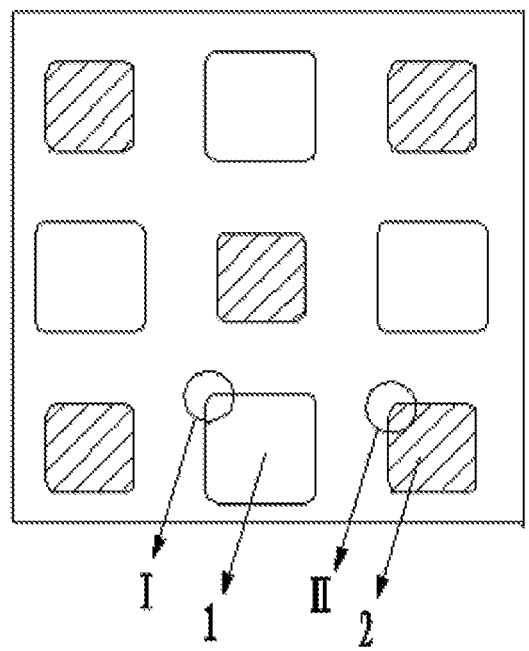
FIG. 19 is a local structure schematic diagram of an inlet honeycomb ceramic surface in Embodiment 8 of the present invention.
Figure 20:
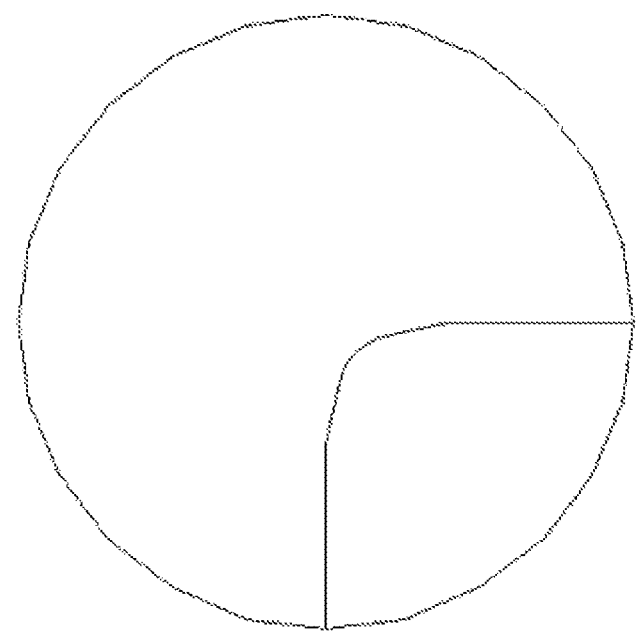
FIG. 20 is a local detailed drawing of I in FIG. 19.
Figure 21:
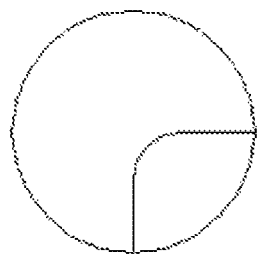
FIG. 21 is a local detailed drawing of II in FIG. 19.

As shown in FIG. 19-FIG. 21, the cross-section of each inlet channel 1 is a square, two adjacent edges of the square are connected by a connecting part composed of two connecting lines and a circular arc located between the two connecting lines, an obtuse angle is formed between the two connecting lines, and the length of the circular arc is smaller than 30%, preferably 15%, of the length of the connecting part. The cross-section of each outlet channel 2 is a square and is provided with a fillet, and the radius of the fillet is greater than 20% of the wall thickness and is smaller than 0.3 mm.

EMBODIMENT 9

Figure 22:
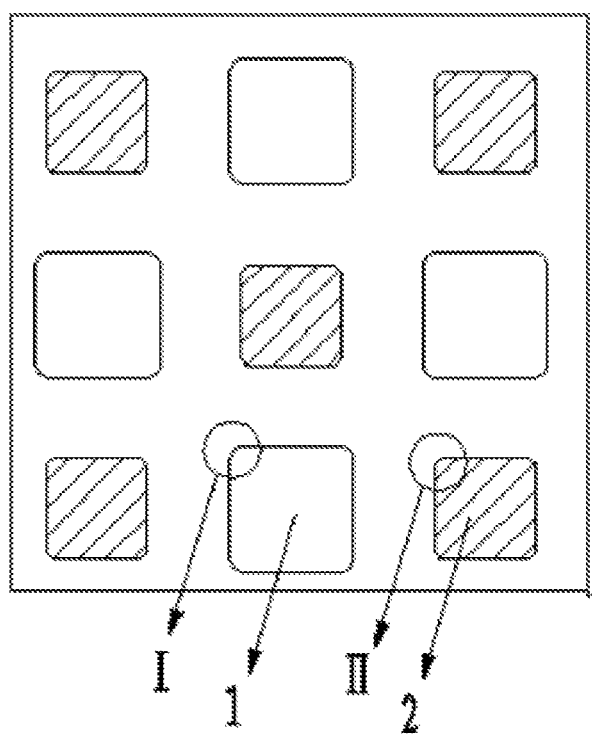
FIG. 22 is a local structure schematic diagram of an inlet honeycomb ceramic surface in Embodiment 9 of the present invention.
Figure 23:
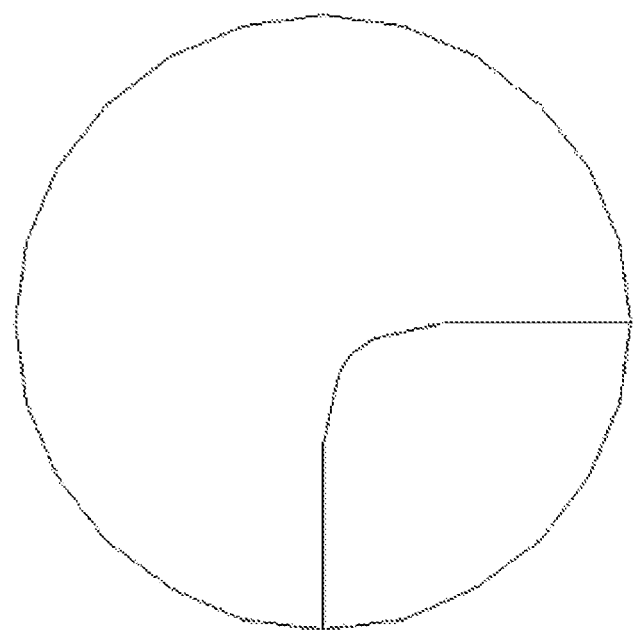
FIG. 23 is a local detailed drawing of I in FIG. 22.
Figure 24:
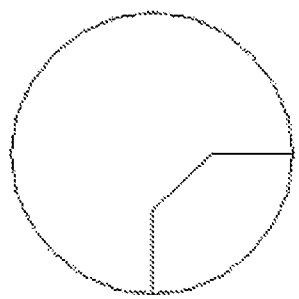
FIG. 24 is a local detailed drawing of II in FIG. 22.

As shown in FIG. 22-FIG. 24, the cross-section of each inlet channel 1 is a square, two adjacent edges of the square are connected by a connecting part composed of two connecting lines and a circular arc located between the two connecting lines, an obtuse angle is formed between the two connecting lines, and the length of the circular arc is smaller than 30%, preferably 15%, of the length of the connecting part. The cross-section of each outlet channel 2 is a square and is provided with a chamfer, the length range of the bevel edge of the chamfer is 5%-30% of the side length of the cross-section of the outlet channel 2, and preferably, the chamfer can be a 45-degree angle and can also be a beveled angle and the like.

According to the above embodiments, the structure design of the inlet channels 1 and the outlet channels 2 is combined, so that the back pressure is improved, and mechanical and thermodynamics strength is increased. Preferably, the cross-section of each inlet channel 1 of the above embodiments can be a square.

According to the thermal shock resistant and asymmetric honeycomb ceramic wall-flow filter provided by the present invention, improvements such as fillet, double line or a combination of double line and circular arc are made on cross-sections of the inlet channels 1, and furthermore, improvements such as square, chamfer or fillet are made on cross-sections of the outlet channels 2, so that the filter has good mechanical properties, low back pressure, and excellent thermal shock resistance.

The above embodiments are only preferred embodiments of the present invention and are not used for limiting the present invention, and any modifications, equivalent replacements, improvements and the like made within the spirit and the principle of the present invention should fall into the protection scope of the present invention.

The invention claimed is:

1. A thermal shock resistant and asymmetric honeycomb ceramic wall-flow filter, comprising an inlet honeycomb ceramic surface and an outlet honeycomb ceramic surface, wherein inlet channels and outlet channels are provided on both the inlet honeycomb ceramic surface and the outlet honeycomb ceramic surface, the inlet channels are in communication with the outlet channels, outlet ends of the inlet channels and inlet ends of the outlet channels are sealed, and an inner diameter of each inlet channel is greater than that of each outlet channel, and wherein a cross-section of each of the inlet channels is a square, two adjacent edges of the square are connected by two connecting lines, an obtuse angle is formed between the two connecting lines, and an included angle between each connecting line and the edge, connected with the connecting line, of the square is smaller than 30 degrees.

2. The thermal shock resistant and asymmetric honeycomb ceramic wall-flow filter according to claim 1, wherein a range of a proportion of an inner diameter of each inlet channel to an inner diameter of each outlet channel is 1.1-1.5.

3. The thermal shock resistant and asymmetric honeycomb ceramic wall-flow filter according to claim 1, wherein a cross-section of each outlet channel is a square.

4. The thermal shock resistant and asymmetric honeycomb ceramic wall-flow filter according to claim 1, wherein a cross-section of each outlet channel is a square and is provided with a fillet, and the radius of the fillet is greater than 20% of a wall thickness and is smaller than 0.3 mm.

5. The thermal shock resistant and asymmetric honeycomb ceramic wall-flow filter according to claim 1, wherein a cross-section of each outlet channel is a square and is provided with a chamfer, and the length range of the bevel edge of the chamfer is 5%-30% of a side length of the cross-section of the outlet channel (2).

* * * * *